United States Patent
Le Corre

(10) Patent No.: US 9,421,990 B2
(45) Date of Patent: Aug. 23, 2016

(54) DAMPING DEVICE, IN PARTICULAR FOR A RAILROAD VEHICLE COUPLING DEVICE

(71) Applicant: ALSTOM TRANSPORT TECHNOLOGIES, Levallois Perret (FR)

(72) Inventor: Dominique Le Corre, Pfaffenhoffen (FR)

(73) Assignee: ALSTOM TRANSPORTATION TECHNOLOGIES, Lavallois Perret (FR)

( * ) Notice: Subject to any disclaimer, the term of this patent is extended or adjusted under 35 U.S.C. 154(b) by 0 days.

(21) Appl. No.: 14/563,855

(22) Filed: Dec. 8, 2014

(65) Prior Publication Data
US 2015/0158508 A1   Jun. 11, 2015

(30) Foreign Application Priority Data
Dec. 9, 2013 (FR) ...................................... 13 62309

(51) Int. Cl.
*B61G 9/00* (2006.01)
*B61G 11/16* (2006.01)
*F16F 7/12* (2006.01)

(52) U.S. Cl.
CPC ............... *B61G 9/00* (2013.01); *B61G 11/16* (2013.01); *F16F 7/123* (2013.01)

(58) Field of Classification Search
CPC ........ B61G 9/00; B61G 11/00; B61G 11/16; B61G 11/18; F16F 7/123
USPC .......................................... 213/64, 66, 67 R
See application file for complete search history.

(56) References Cited

U.S. PATENT DOCUMENTS

| 6,357,612 | B1 * | 3/2002 | Monaco | B61G 9/08 188/315 |
| 6,393,999 | B1 * | 5/2002 | Schneider | F16F 7/123 104/254 |
| 6,702,345 | B1 * | 3/2004 | Yoshida | B60R 19/34 188/377 |
| 7,287,655 | B2 * | 10/2007 | Sommerfeld | B61G 9/04 213/64 |
| 7,484,781 | B1 * | 2/2009 | Garber | B60R 19/34 293/132 |

(Continued)

FOREIGN PATENT DOCUMENTS

EP   0529433 A1   3/1993
WO   2009/072843 A2   6/2009

OTHER PUBLICATIONS

Search Report for corresponding France Patent Application No. 1362309 dated Aug. 14, 2014.

*Primary Examiner* — Jason C Smith
(74) *Attorney, Agent, or Firm* — Knobbe Martens Olson & Bear LLP

(57) ABSTRACT

The damping device (10) according to the invention is designed to damp a shock in a longitudinal direction (X). It includes a central pad (12), designed to be secured with a first member (14A) of the coupling device (14), and two side wings (18), each formed by a thin plate extending in the longitudinal direction (X). Each side wing (18) includes at least one first longitudinal region (20), secured to the central pad (12), at least one second longitudinal region (22), designed to be secured with a railroad vehicle, and at least one line of least resistance (24), separating the first (20) and second (22) longitudinal regions from each other, extending over the side wing (18) in the longitudinal direction (X).

8 Claims, 2 Drawing Sheets

(56) References Cited

U.S. PATENT DOCUMENTS

| | | | | |
|---|---|---|---|---|
| 2008/0236440 A1* | 10/2008 | Nakamura | ............. | B61D 15/06 105/392.5 |
| 2009/0000506 A1* | 1/2009 | Jaede | ..................... | B61D 15/06 105/392.5 |
| 2009/0065462 A1* | 3/2009 | Gansweidt | ............... | B61G 7/10 213/1 A |
| 2010/0218701 A1* | 9/2010 | Graf | ....................... | B61G 11/16 105/392.5 |
| 2011/0233016 A1* | 9/2011 | Lim | ........................ | B60R 19/34 188/374 |
| 2013/0105431 A1* | 5/2013 | Hansson | .................. | B61G 3/16 213/179 |
| 2013/0126458 A1* | 5/2013 | Ewerding | ................ | B61G 7/00 213/7 |
| 2013/0270210 A1* | 10/2013 | Kukulski | ................ | B61G 9/10 213/62 R |
| 2015/0069003 A1* | 3/2015 | Watts | ..................... | B61G 11/16 213/221 |

* cited by examiner

DAMPING DEVICE, IN PARTICULAR FOR A RAILROAD VEHICLE COUPLING DEVICE

FIELD OF THE INVENTION

The present invention relates to a damping device, in particular for a railroad vehicle coupling device.

BACKGROUND OF THE INVENTION

A coupling device is designed to provide a connection between two railroad vehicles. Such a coupling device is known in itself, and in particular includes a first member, designed to be connected to one of said vehicles, and a second member designed to be connected to the other of said vehicles.

In some cases, a damping device is arranged behind a connection between the first member of the coupling device and the corresponding railroad vehicle, in order to absorb the energy of an impact, in a longitudinal direction, from one vehicle to another.

Such a damping device is already known in the state of the art, but has a relatively complex and heavy structure.

SUMMARY OF THE INVENTION

The invention in particular aims to resolve this drawback, by providing a damping device having a simple structure, therefore inexpensive to produce, while contributing to continuous and homogenous energy dissipation throughout the duration of an impact.

To that end, the invention in particular relates to a damping device, in particular for a railroad vehicle coupling device, designed to damp an impact in a first so-called longitudinal direction, characterized in that it includes a central pad, designed to be secured with a first member of the coupling device, and two side wings, each formed by a thin plate extending in the longitudinal direction, each side wing including:
  at least one first longitudinal region, secured to the central pad,
  at least one second longitudinal region, designed to be secured with a first railroad vehicle,
  at least one line of least resistance, separating the first and second longitudinal regions from each other, extending over the side wing in the longitudinal direction.

In case of impact, the central pad is moved longitudinally in the space delimited between the side wings. This movement involves tearing of said line of least resistance, and deformation of said first longitudinal region, thus absorbing at least part of the energy from the impact.

This energy absorption is done over the entire length of the line of least resistance, therefore for example over approximately the entire length of the side wings.

It should be noted that such a damping device has a very simple structure.

A damping device according to the invention may further include one or more of the following features, considered alone or according to all technically possible combinations.

Each side wing includes two second longitudinal regions, i.e., an upper second longitudinal region and a lower second longitudinal region, positioned on either side of the first longitudinal region in a second direction substantially perpendicular to the longitudinal direction, the upper second longitudinal region is separated from the first longitudinal region by an upper line of least resistance, and the lower second longitudinal region is separated from the first longitudinal region by a lower line of least resistance, the upper and lower lines of least resistance extending parallel to each other, in the longitudinal direction.
  The damping device comprises a metal foil, said metal foil being cut and bent so as to form the central pad and the side wings.
  Each second longitudinal region of the side wings includes a first part, positioned on a first side of the central pad in the longitudinal direction, and a second part, positioned on a second side of the central pad in the longitudinal direction, said first part being designed to be secured to said first railroad vehicle.
  The central pad includes fastening orifices for fastening said first member to the coupling device.
  The central pad has a height, in a second direction perpendicular to the longitudinal direction, substantially equal to a height of the first region of each side wing in that same second direction.
  The side wings extend perpendicular to the central pad, and parallel to each other.
  The side wings are symmetrical to each other relative to a central plane, parallel to the longitudinal direction and to a second direction perpendicular to the longitudinal direction, said central plane passing through a center of the central pad, said center being defined in a third direction perpendicular to the longitudinal direction and the second direction.

BRIEF DESCRIPTION OF THE DRAWINGS

The invention will be better understood upon reading the following description, provided solely as an example and done in reference to the appended figures, in which.

DETAILED DESCRIPTION

Figure 1:
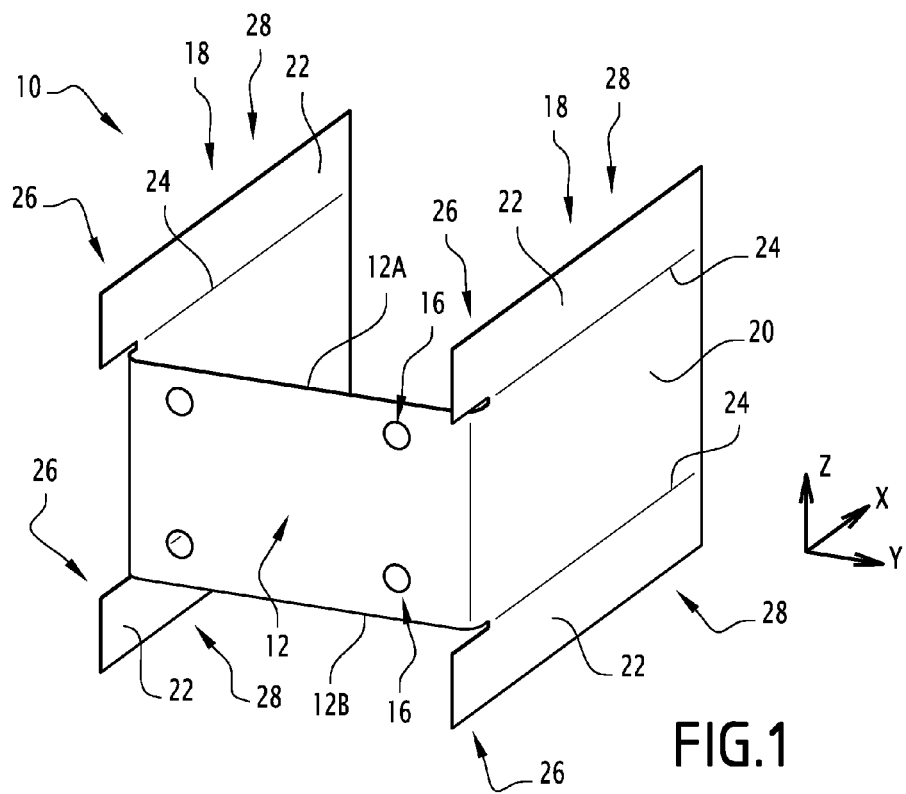
FIG. 1 is a perspective view of a damping device according to one example of the invention.

FIG. 1 shows a damping device 10, designed to be arranged behind a coupling device 14 of the railroad vehicle, and designed to damp any impact in a first direction, called longitudinal direction X.

Figure 3:
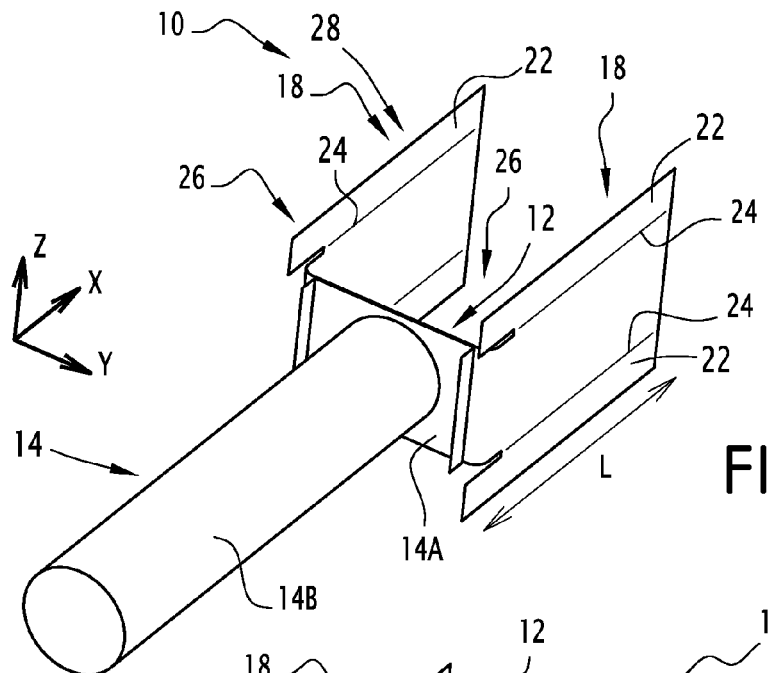
FIG. 3 is a perspective view of a coupling device, partially shown, including the damping device of FIG. 1.
Figure 4:
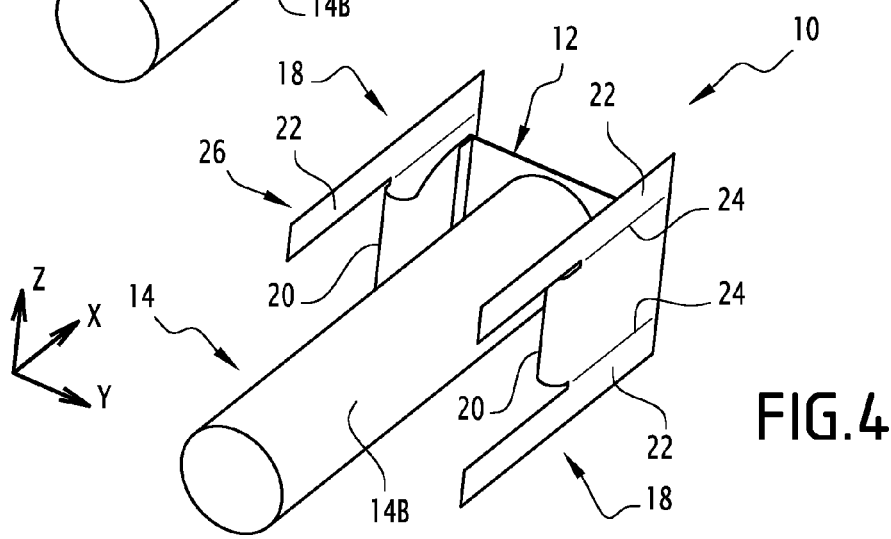
FIG. 4 is a view similar to FIG. 3 of the coupling device during damping of an impact.
Figure 5:
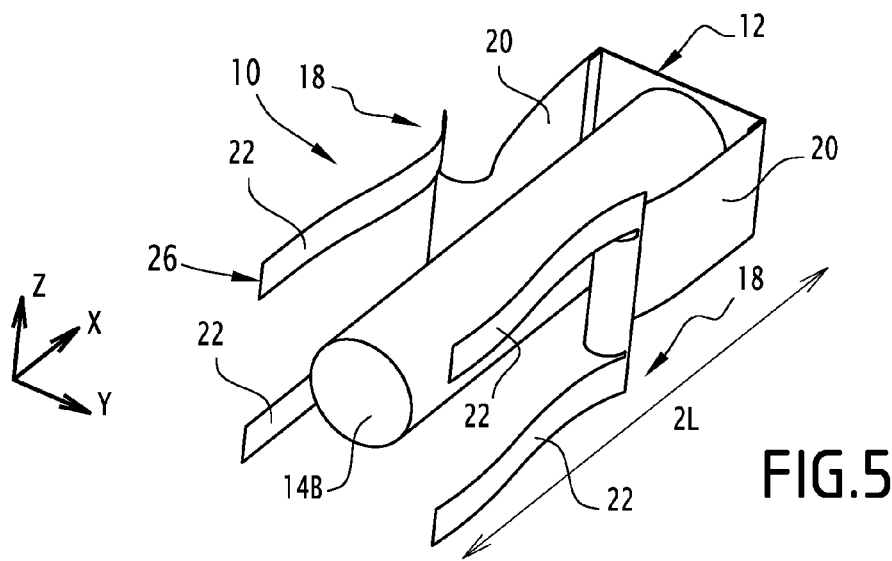
FIG. 5 is a view similar to FIG. 4 of the coupling device of FIG. 3, at the end of damping of an impact.

Said coupling device 14 is shown in more detail in FIGS. 3 to 5. This coupling device 14 includes a first member 14A, designed to be connected to the damping device 10 of a first railroad vehicle, and a second member 14B connected to a second railroad vehicle.

More particularly, the coupling device 14 includes a planar fastening base 14A, forming said first member, and a beam 14B, forming said second member, secured to the planar base 14A, and extending from that planar base 14A in the longitudinal direction X.

The beam 14B for example has a generally cylindrical shape.

The damping device 10 includes a central pad 12, designed to be secured with the planar fastening base 14A of the coupling device, as shown in FIG. 3. To that end, the central pad 12 for example includes fastening orifices 16 for the planar fastening base 14A.

The damping device 10 further includes two side wings 18, each formed by a thin plate, extending in a plane parallel to the longitudinal direction X, and a second direction Z, called vertical direction, perpendicular to the longitudinal direction X. Thus, the side wings 18 extend perpendicular to the central pad 12, and parallel to each other.

Each side wing 18 is said to be "thin", because its thickness in a third direction, called transverse direction Y, perpendicular to the longitudinal direction X and the vertical direction Z, is much smaller than its length, in the longitudinal direction X, and its height in the vertical direction Z.

Advantageously, the side wings 18 are symmetrical to each other, relative to a central plane parallel to the longitudinal direction X and the vertical direction Z, that central plane being defined as passing through the center of the central pad 12, that center being defined in the transverse direction Y.

Each side wing 18 includes at least one first longitudinal region 20, secured to the central pad 12, and at least one second longitudinal region 22, as well as, between each first longitudinal region 20 and each second longitudinal region 22, a respective line of least resistance 24, separating said first 20 and second 22 regions and extending over the side wing 18 in the longitudinal direction X. The first longitudinal region 20 is also called "deformable region", and each second longitudinal region 22 is also called "fastening region".

Each second longitudinal region 22 is designed to be secured with said first railroad vehicle (not shown).

In the illustrated example, each side wing 18 includes two second longitudinal regions 22, namely an upper second longitudinal region and a lower second longitudinal region, positioned on either side of the first longitudinal region 20 in the vertical direction Z.

Thus, the upper second longitudinal region is separated from the first longitudinal region 20 by an upper line of least resistance, and the lower second longitudinal region is separated from the first longitudinal region 20 by a lower line of least resistance. These upper and lower lines of least resistance 24 for example extend parallel to each other, in the longitudinal direction X.

Advantageously, each second longitudinal region 22 of each side wing 18 includes a first part 26 (also called front part), positioned on a first side of the central pad 12 in the longitudinal direction X, and a second part 28 (also called rear part), positioned on a second side of the central pad 12 in the longitudinal direction X. This second part 28 is positioned on the same side of the central pad 12 as the first longitudinal region 20.

Said first railroad vehicle is then designed to be secured to the first part 26 of each second longitudinal region 22. Such a connection by the first part 26 of the damping device 10 simplifies the disassembly and reassembly of that damping device 10, in particular in the case of a collision causing deformation, i.e., the movement of the central pad 12 between the wings 18.

According to one alternative that is not shown, the side wings 18 are incorporated into the chassis of the railroad vehicle. Thus, in this example, the damping device 10 is an integral part of the chassis of the railroad vehicle.

Advantageously, the central pad 12 has a height, in the vertical direction Z, substantially equal to a height of the first region 20 of each side wing 18 in that same vertical direction Z. Thus, the upper and lower lines of least resistance 24 are respectively situated in the extension of an upper 12A and lower 12B edge of the central pad 12.

Advantageously, the damping device 10 includes a metal foil, cut and folded so as to form the central pad 12 and the side wings 18. This metal foil is shown, before folding, in FIG. 2. It clearly appears that such a metal foil has a simple structure, such that it is simple and cost-effective to produce.

Figure 2:
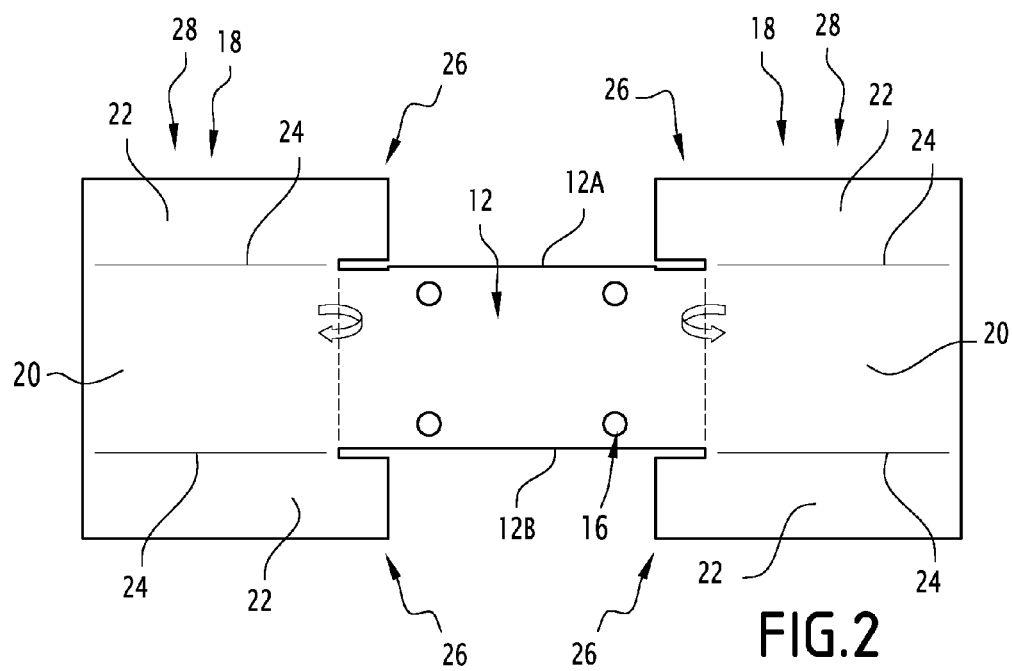
FIG. 2 is a top view of a metal sheet, seen flat, designed to be bent to form the damping device of FIG. 1.

Thus, a method for manufacturing the damping device 10 includes a step for cutting a metal foil to give it the shape shown in FIG. 2, followed by a step for outlining grooves to form the lines of least resistance 24, and a step for bending the foil, by bending the side wings 18 at 90° from the central pad 12, to delimit that central pad 12 and those side wings 18.

The coupling device 14 and the damping device 10 as previously described are partially shown in FIG. 3.

As previously indicated, the coupling device 14 is secured to the central pad 12, by means of the planar fastening base 14A in contact with that central pad 12.

Advantageously, the planar base 14A has a dimension, in the transverse direction Y, smaller than the distance between the side wings 18 in that same transverse direction Y. Thus, any force exerted by the planar base 14A on the central pad 12 in the longitudinal direction X is oriented toward the space delimited between the side wings 18. The movement of the central pad 12 between the side wings 18 is then ensured during deformation of the damping device 10, as will be described below.

In case of impact in the longitudinal direction X, the coupling device 14 transmits the force due to the impact to the central pad 12, in the longitudinal direction X, via the first member 14A.

The first part 26 of each second longitudinal region 22 being connected to the first railroad vehicle, the force due to the impact is concentrated at the connecting points between the central pad 12 and the second longitudinal regions 22.

However, the first parts 26 of these second longitudinal regions 22 are positioned in front of the central pad 12, and the lines of least resistance 24 are situated in the extension of the upper 12A and lower 12B edges of the central pad 12. As a result, said connecting points form primers for tearing of the side wings 18 along the lines of least resistance 24.

Thus, by moving the central pad 12 in the longitudinal direction X, between the side wings 18, and keeping the first parts 26 of the second regions 22 of those side wings 18 secured to said first railroad vehicle, the tearing along the lines of least resistance 24 situated in the extension of the upper 12A and lower 12B edges of the central pad 12 is caused, as well as the deformation of the first regions 20 of those side wings 18, as shown in FIG. 4.

It will be noted that this tearing is made possible by the fact that the side wings 18 are formed by thin plates. The thickness of these thin plates is chosen to be small enough to allow tearing, but large enough for that tearing to require relatively significant energy.

The energy necessary to perform the tearing of the side wings 18 and the deformation of the longitudinal regions 20 is taken from the initial energy of the impact. In other words, at least part of the energy of the impact is thus absorbed.

The tearing of the side wings 18 can thus continue until each line of least resistance 24 is torn over substantially its entire length, as shown in FIG. 5. It should be noted that the bulk of the side wings 18 in the longitudinal direction X, denoted L in FIG. 3, is substantially doubled between its initial configuration (FIG. 3) and its final configuration (FIG. 5).

It will be recalled that the side wings 18 are symmetrical to each other, as previously indicated. It is thus ensured that they deform symmetrically relative to each other during absorption of the impact, therefore that said absorption of the impact is evenly distributed between the two side wings 18. Furthermore, guiding of the movement of the first member 14A in the longitudinal direction X is thus ensured.

It clearly appears that the absorption device 10 according to the invention allows an effective absorption of energy due to an impact, in particular because that absorption is done substantially homogenously over the entire length of the side wings 18, since the tearing of the lines of least resistance 24 is done substantially over the entire length.

It will be noted that the invention is not limited to the embodiment previously described, but could include various alternatives without going beyond the scope of the claims.

In particular, in one alternative, each side wing 18 includes several deformable regions 20, each deformable region 20 then being surrounded by two fastening regions 22 on either side in the vertical direction Z. In that case, each deformable region 20 is connected to the central pad 12, and separated from the fastening regions 22 that surround it by a respective line of least resistance 24.

According to another alternative, the damping device 10 could be formed by several elements attached to each other, in particular a central pad attached and fastened on two metal sheets forming the side wings.

The invention claimed is:

1. A damping device for a railroad vehicle coupling device, designed to damp an impact in a longitudinal direction, including a central pad, designed to be secured with a first member of the coupling device, and two side wings, each formed by a thin plate extending in the longitudinal direction, each side wing including:
   at least one first longitudinal region, secured to the central pad, configured to deform in case of impact
   at least one second longitudinal region, designed to be secured with a first railroad vehicle,
   at least one line of least resistance, separating the first and second longitudinal regions from each other, extending over the side wing in the longitudinal direction, configured to tear in case of impact.

2. The damping device according to claim 1, wherein:
   each side wing includes two second longitudinal regions, i.e., an upper second longitudinal region and a lower second longitudinal region, positioned on either side of the first longitudinal region in a second direction substantially perpendicular to the longitudinal direction,
   the upper second longitudinal region is separated from the first longitudinal region by an upper line of least resistance, and the lower second longitudinal region is separated from the first longitudinal region by a lower line of least resistance, the upper and lower lines of least resistance extending parallel to each other, in the longitudinal direction.

3. The damping device according to claim 1, comprising a metal foil, said metal foil being cut and bent so as to form the central pad and the side wings.

4. The damping device according to claim 1, wherein each second longitudinal region of the side wings includes a first part, positioned on a first side of the central pad in the longitudinal direction, and a second part, positioned on a second side of the central pad in the longitudinal direction, said first part being designed to be secured to said first railroad vehicle.

5. The damping device according to claim 1, wherein the central pad includes fastening orifices for fastening said first member to the coupling device.

6. The damping device according to claim 1, wherein the central pad has a height, in a second direction perpendicular to the longitudinal direction, substantially equal to a height of the first region of each side wing in that same second direction.

7. The damping device according to claim 6, wherein the side wings extend perpendicular to the central pad, and parallel to each other.

8. The damping device according to claim 7, wherein the side wings are symmetrical to each other relative to a central plane, parallel to the longitudinal direction and to a second direction perpendicular to the longitudinal direction, said central plane passing through a center of the central pad, said center being defined in a third direction perpendicular to the longitudinal direction and the second direction.

* * * * *